(12) United States Patent
Freese et al.

(10) Patent No.: US 10,724,366 B2
(45) Date of Patent: Jul. 28, 2020

(54) EMULSION DETECTION USING OPTICAL COMPUTING DEVICES (71) Applicant: HALLIBURTON ENERGY SERVICES, INC., Houston, TX (US)

(72) Inventors: Robert Paul Freese, Pittsboro, NC (US); Tian He, Houston, TX (US); Christopher Michael Jones, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 30 days.

(21) Appl. No.: 15/623,321

(22) Filed: Jun. 14, 2017

(65) Prior Publication Data
US 2017/0284196 A1    Oct. 5, 2017

Related U.S. Application Data (63) Continuation of application No. 14/760,343, filed as application No. PCT/US2014/040266 on May 30, 2014, now abandoned.

(51) Int. Cl.
E21B 49/08    (2006.01)
E21B 47/00    (2012.01)
(Continued)

(52) U.S. Cl.
CPC .............. E21B 49/08 (2013.01); E21B 47/00 (2013.01); G01J 3/00 (2013.01); G01N 21/31 (2013.01);
(Continued)

(58) Field of Classification Search
CPC ......... E21B 49/08; E21B 47/00; G01N 21/84; G01N 21/85; G01N 21/31; G01V 8/00; G01V 8/10; G01J 3/00
See application file for complete search history.

(56) References Cited

U.S. PATENT DOCUMENTS 5,546,792 A    8/1996  Becker
2005/0018176 A1*  1/2005 Smith ................ G01N 33/2823
                                                 356/128
(Continued)

FOREIGN PATENT DOCUMENTS

JP          01140045 A    6/1989
WO    WO-2015183310 A1    12/2015

OTHER PUBLICATIONS

Cates et al., "Theory of Microemulsions: Comparison with Experimental Behavior," Langmuir, Jul. 1988, vol. 4, No. 4, pp. 802-806.
(Continued)

Primary Examiner — David P Porta
Assistant Examiner — Shun Lee
(74) Attorney, Agent, or Firm — Gilliam IP PLLC (57) ABSTRACT Disclosed is the detection of emulsions and microdispersions with an optical computing device. One disclosed method includes emitting electromagnetic radiation from an electromagnetic radiation source, optically interacting the electromagnetic radiation with a fluid and thereby generating fluid interacted radiation, detecting a portion of the fluid interacted radiation with a reference detector arranged within an optical channel of an optical computing device, generating a reference signal with the reference detector, and determining an emulsive state of the fluid based on the reference signal.

18 Claims, 3 Drawing Sheets (51) Int. Cl.
  *G01V 8/10* (2006.01)
  *G01N 21/31* (2006.01)
  *G01N 21/85* (2006.01)
  *G01V 8/00* (2006.01)
  *G01J 3/00* (2006.01)
  *G01N 21/84* (2006.01)

(52) U.S. Cl.
  CPC ............ *G01N 21/84* (2013.01); *G01N 21/85* (2013.01); *G01V 8/00* (2013.01); *G01V 8/10* (2013.01); *E21B 2049/085* (2013.01)

(56) References Cited

U.S. PATENT DOCUMENTS

| | | |
|---|---|---|
| 2005/0134845 A1 | 6/2005 | Bordelon |
| 2008/0037006 A1 | 2/2008 | Canas Triana et al. |
| 2008/0173804 A1 | 7/2008 | Indo et al. |
| 2009/0166085 A1* | 7/2009 | Ciglenec ............ E21B 49/08 175/24 |
| 2009/0199085 A1 | 8/2009 | Park |
| 2009/0219539 A1 | 9/2009 | Myrick et al. |
| 2009/0219597 A1* | 9/2009 | Myrick ............ G06E 3/001 359/107 |
| 2014/0076551 A1 | 3/2014 | Pelletier et al. |
| 2014/0080223 A1 | 3/2014 | Tunheim et al. |
| 2016/0186558 A1 | 6/2016 | Freese et al. |

OTHER PUBLICATIONS

International Search Report and Written Opinion from PCT/US2014/040266, dated Feb. 6, 2015.
Indonesian Application Serial No. P00201605656; First Office Action; dated Apr. 2, 2019, 3 pages.
European Application Serial No. 14893284.1; Communication Pursuant to Article 94(3); dated May 10, 2019, 8 pages.
Mikula, "Emulsion Characterization", American Chemical Society, May 5, 1992, pp. 79-129.
Saudi Arabian Application Serial No. 516371918; Office Action, dated Feb 13, 2020, 12 pages.

* cited by examiner

EMULSION DETECTION USING OPTICAL COMPUTING DEVICES

CROSS-REFERENCE TO RELATED APPLICATION

This present application is a continuation application of U.S. application Ser. No. 14/760,343, filed Jul. 10, 2015, which claims priority to International Patent Application No. PCT/US2014/040266, filed May 30, 2014, all of which are hereby incorporated by reference in their entirety for all purposes.

BACKGROUND

The present disclosure generally relates to systems and methods of optical computing and, more specifically, the detection of emulsions and microdispersions with an optical computing device.

In the oil and gas industry, the collection and sampling of underground fluids contained in subterranean formations is well known. Samples of formation fluids are collected and analyzed for various purposes, such as to determine the existence, composition and producibility of subterranean hydrocarbon fluid reservoirs. This aspect of the exploration and recovery process can be crucial in developing exploitation strategies and impacts significant financial expenditures and savings.

In a typical sampling procedure, a sampling tool is lowered to a predetermined depth or location within a wellbore on a conveyance, such as a wireline, slickline, coiled tubing, jointed tubing or the like. The sampling tool may include multiple sensors and/or gauges used to monitor and detect various parameters of the formation fluid. For instance, densitometers are often used to obtain mass and volume flow measurements, and fluid concentration measurements of formation fluids. Moreover, optical computing devices are sometimes used to detect concentrations of particular analytes or chemical compounds present within the formation fluids.

When the sampling tool reaches the desired depth, the sampling tool may be activated to pump or circulate formation fluid through the sampling tool so that the sensors/gauges can monitor the incoming fluids and "sample" the circulating fluid. While monitoring the formation fluids, however, the state of the formation fluids may change into an emulsive state due to, for example, fluid pumping parameters through the sampling tool, downhole environmental conditions (e.g., temperature, pressure, etc.), or a combination of both. As used herein the term "emulsive state" refers to the phase or state of a fluid, such as a formation fluid, and whether said fluid has formed an emulsion, a macroemulsion, a microemulsion, a dispersion, a microdispersion, a colloid, a stable micelle solution, or any combination thereof.

When a formation fluid forms an emulsion or microdispersion, for example, it can be quite difficult to accurately measure the properties or characteristics of the formation fluid, such as the concentration of a particular hydrocarbon present therein. In order to properly measure the properties of the formation fluid, the emulsion or microdispersion must first be broken, which can be done by adding heat, various chemicals, or slow stirring agents, which can take months and even years. Accordingly, for fluid sampling and testing purposes, it may prove advantageous to know when an emulsion is present downhole within a formation fluid being analyzed.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, without departing from the scope of this disclosure.

DETAILED DESCRIPTION

The present disclosure generally relates to systems and methods of optical computing and, more specifically, the detection of emulsions and microdispersions with an optical computing device.

The present disclosure describes the use of optical computing devices, also commonly referred to as "opticoanalytical devices," in detecting the emulsive state of fluids during wellbore sampling operations. Such optical computing devices will often employ a light source that emits electromagnetic radiation that reflects from or is transmitted through the sample and optically interacts with an optical processing element to determine quantitative and/or qualitative values of one or more physical or chemical properties of the substance being analyzed. The optical processing element may be, for example, an integrated computational element (ICE) core. One type of ICE core is an optical thin film interference device, also known as a multivariate optical element (MOE). Each ICE core can be designed to operate over a continuum of wavelengths in the electromagnetic spectrum from the vacuum-UV to infrared (IR) ranges, or any sub-set of that region. Electromagnetic radiation that optically interacts with the sample substance is changed and processed by the ICE core so as to be measured by a detector. The output of the detector can be correlated to a physical or chemical property of the substance being analyzed.

As used herein, the term "characteristic" or "characteristic of interest" refers to a chemical, mechanical, or physical property of a substance or a sample of the substance. The characteristic of a substance may include a quantitative or qualitative value of one or more chemical constituents or compounds present therein or any physical property associated therewith. Such chemical constituents and compounds may be referred to herein as "analytes." Illustrative characteristics of a substance that can be analyzed with the help of the optical processing elements described herein can include, for example, chemical composition (e.g., identity and concentration in total or of individual components), phase presence (e.g., gas, oil, water, etc.), impurity content, pH, alkalinity, viscosity, density, ionic strength, total dissolved solids, salt content (e.g., salinity), porosity, opacity, bacteria content, total hardness, transmittance, state of matter (solid, liquid, gas, emulsion, mixtures thereof, etc.), and the like.

As used herein, the term "substance," or variations thereof, refers to at least a portion of matter or material of interest to be tested or otherwise evaluated using the optical computing devices described herein. The substance includes the characteristic of interest, as defined above. The substance may be any fluid capable of flowing, including particulate solids, liquids, gases (e.g., air, nitrogen, carbon dioxide, argon, helium, methane, ethane, butane, and other hydrocarbon gases, hydrogen sulfide, and combinations thereof), slurries, emulsions, powders, muds, glasses, mixtures, combinations thereof, and may include, but is not limited to, aqueous fluids (e.g., water, brines, etc.), non-aqueous fluids (e.g., organic compounds, hydrocarbons, oil, a refined component of oil, petrochemical products, and the like), acids, surfactants, biocides, bleaches, corrosion inhibitors, foamers and foaming agents, breakers, scavengers, stabilizers, clarifiers, detergents, treatment fluids, fracturing fluids, formation fluids, or any oilfield fluid, chemical, or substance commonly found in the oil and gas industry. In some cases, the substance may also refer to a solid material such as, but not limited to, rock formations, concrete, solid wellbore surfaces, pipes or flow lines, and solid surfaces of any wellbore tool or projectile (e.g., balls, darts, plugs, etc.).

As used herein, the term "flow path" refers to a route through which a fluid is capable of being transported between at least two points. In some cases, the flow path need not be continuous or otherwise contiguous between the two points. Exemplary flow paths include, but are not limited to, a flow line, a pipeline, production tubing, drill string, work string, casing, a wellbore, an annulus defined between a wellbore and any tubular arranged within the wellbore, combinations thereof, or the like. It should be noted that the term "flow path" does not necessarily imply that a fluid is flowing therein, rather that a fluid is capable of being transported or otherwise flowable therethrough.

As used herein, the term "electromagnetic radiation" refers to radio waves, microwave radiation, terahertz, infrared and near-infrared radiation, visible light, ultraviolet light, X-ray radiation and gamma ray radiation.

As used herein, the term "optically interact" or variations thereof refers to the reflection, transmission, scattering, diffraction, or absorption of electromagnetic radiation either on, through, or from an optical processing element (e.g., an integrated computational element) or a substance being analyzed with the help of the optical processing element. Accordingly, optically interacted light refers to electromagnetic radiation that has been reflected, transmitted, scattered, diffracted, or absorbed by, emitted, or re-radiated, for example, using an optical processing element, but may also apply to optical interaction with a substance.

Figure 1:
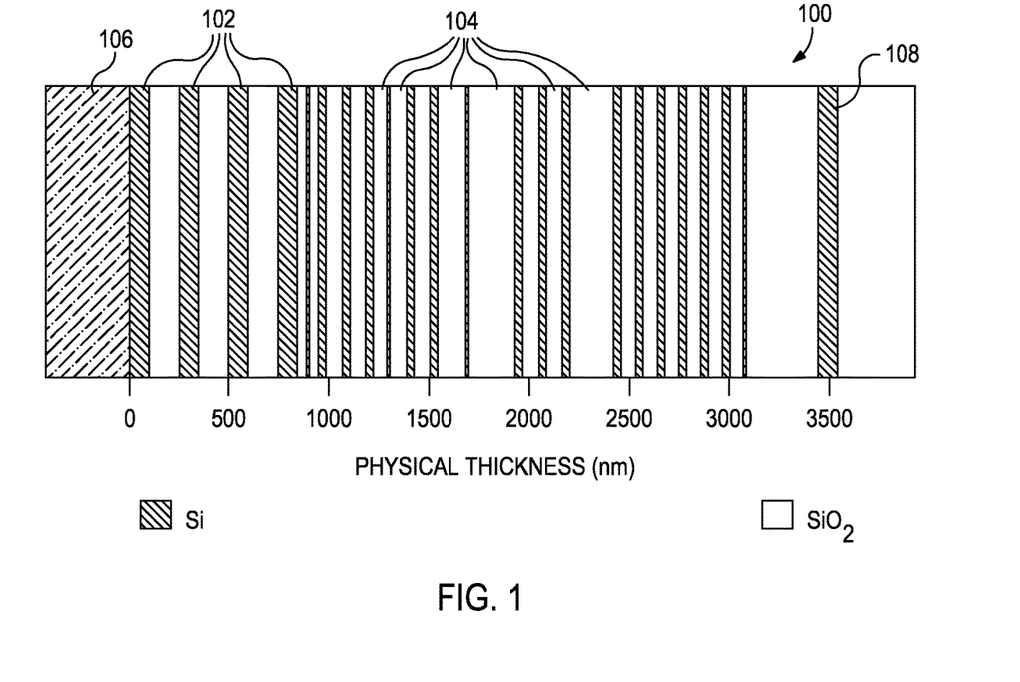
FIG. 1 illustrates an exemplary integrated computation element, according to one or more embodiments.

Referring to FIG. 1, illustrated is an ICE core 100 that may be used in an optical computing device of the present disclosure. As illustrated, the ICE core 100 includes a plurality of alternating thin film layers shown as layers 102 and 104. The first layers 102 are made of a material that exhibits a high index of refraction, such as silicon (Si), and the second layers 104 are made of a material that exhibits a low index of refraction, such as quartz ($SiO_2$). Other examples of materials that might be used include, but are not limited to, niobia and niobium, germanium and germania, MgF, SiO, and other high and low index materials generally known in the art. The layers 102, 104 are strategically deposited on an optical substrate 106, such as BK-7 optical glass. In other embodiments, the substrate 106 may be another type of optical substrate, such as another optical glass, silica, sapphire, silicon, germanium, zinc selenide, zinc sulfide, or various plastics such as polycarbonate, polymethylmethacrylate (PMMA), polyvinylchloride (PVC), diamond, ceramics, combinations thereof, and the like.

At the opposite end (e.g., opposite the substrate 106 in FIG. 1), the ICE core 100 may include a layer 108 that is generally exposed to the environment of the device or installation. The number of layers 102, 104 and the thickness of each layer 102, 104 are determined from the spectral attributes acquired from a spectroscopic analysis of a characteristic of the substance being analyzed using a conventional spectroscopic instrument. The spectrum of interest of a given characteristic typically includes any number of different wavelengths.

It should be understood that the ICE core 100 depicted in FIG. 1 does not in fact represent any particular ICE core configured to detect a specific characteristic of a given substance, but is provided for purposes of illustration only. Consequently, the number of layers 102, 104 and their relative thicknesses, as shown in FIG. 1, bear no correlation to any particular substance or characteristic thereof. Nor are the layers 102, 104 and their relative thicknesses necessarily drawn to scale, and therefore should not be considered limiting of the present disclosure.

In some embodiments, the material of each layer 102, 104 can be doped or two or more materials can be combined in a manner to achieve the desired optical characteristic. Exemplary variations of the ICE core 100 may also include holographic optical elements, gratings, piezoelectric, light pipe, and/or acousto-optic elements, for example, that can create transmission, reflection, and/or absorptive properties of interest.

The multiple layers 102, 104 may exhibit different refractive indices. By properly selecting the materials of the layers 102, 104 and their relative thickness and spacing, the ICE core 100 will be configured to selectively transmit or reflect predetermined fractions of electromagnetic radiation at different wavelengths. Each wavelength is given a predetermined weighting or loading factor. The thickness and spacing of the layers 102, 104 may be determined using a variety of approximation methods from the spectrum of the characteristic or analyte of interest. These methods may include inverse Fourier transform (IFT) of the optical transmission spectrum and structuring the ICE core 100 as the physical representation of the IFT. The approximations convert the IFT into a structure based on known materials with constant refractive indices.

The weightings that the layers 102, 104 of the ICE core 100 apply at each wavelength are set to the regression weightings described with respect to a known equation, or data, or spectral signature. For instance, when electromagnetic radiation interacts with a substance, unique physical and chemical information about the substance is encoded in the electromagnetic radiation that is reflected from, transmitted through, or radiated from the substance. This information is often referred to as the spectral "fingerprint" of the substance. The ICE core 100 is configured to perform the dot product of the received electromagnetic radiation and the wavelength dependent transmission function of the ICE core 100. The wavelength dependent transmission function of the ICE core 100 is dependent on the substrate, the material refractive index of each layer, the number of layers 102, 104 and thickness of each layer 102, 104. As a result, the output light intensity of the ICE core 100 is related to the characteristic or analyte of interest.

Figure 2:
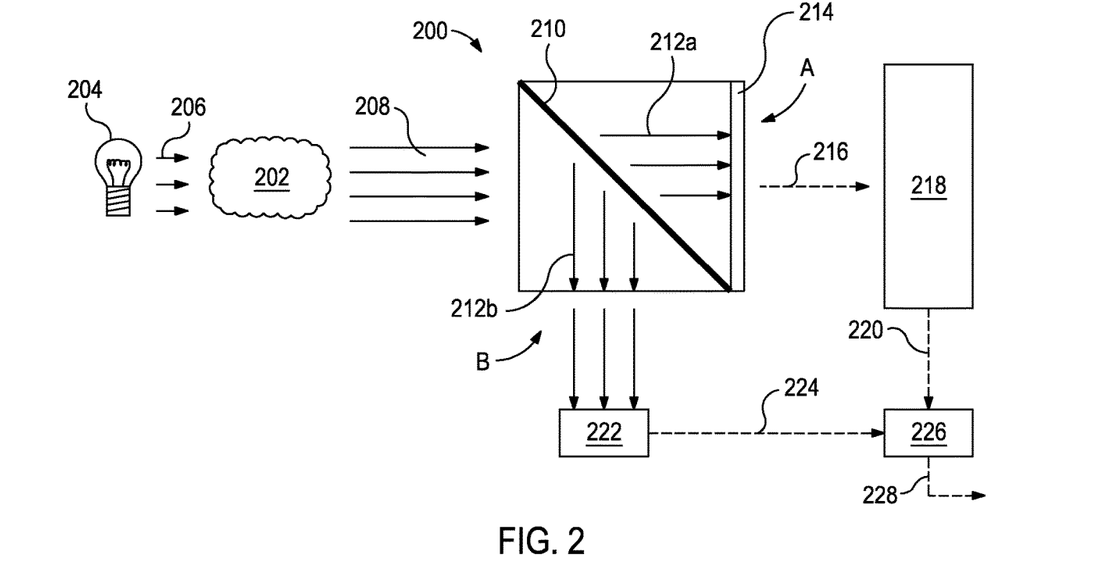
FIG. 2 illustrates a block diagram that non-mechanistically illustrates how an optical computing device distinguishes electromagnetic radiation related to a characteristic of interest from other electromagnetic radiation, according to one or more embodiments.

Referring now to FIG. 2, illustrated is a block diagram that non-mechanistically illustrates how an optical computing device 200 is able to distinguish electromagnetic radiation related to a characteristic of a sample substance 202 from other electromagnetic radiation. As shown in FIG. 2, an electromagnetic radiation source 204 may emit or otherwise generate electromagnetic radiation 206, where the electromagnetic radiation 206 is any type as described herein. In some embodiments, the electromagnetic radiation source 204 is a light bulb, a light emitting diode (LED), a laser, a blackbody, a photonic crystal, an X-Ray source, a supercontinuum source, combinations thereof, or the like. The electromagnetic radiation 206 is directed toward the sample substance 202, which contains an analyte of interest (e.g., a characteristic of the sample substance 202) desired to be determined. The electromagnetic radiation 206 optically interacts with the sample substance 202 and produces fluid interacted radiation 208 (e.g., sample-interacted light), some of which may be electromagnetic radiation corresponding to the characteristic or analyte of interest and some of which may be background electromagnetic radiation corresponding to other components or characteristics of the sample substance 202.

While FIG. 2 shows the electromagnetic radiation 206 as passing through the sample substance 202, other embodiments of the device 200 may reflect the electromagnetic radiation 206 off the sample substance 202, such as may be required when the sample substance 202 is translucent, opaque, or solid, and equally produce the fluid interacted radiation 208.

The fluid interacted radiation 208 may impinge upon the optical computing device 200, which may contain, for example, a beam splitter 210. The beam splitter 210 may be configured to split the fluid interacted radiation 208 into a first beam of light 212a directed in a first or primary channel A and a second beam of light 212b directed in a second or reference channel B. As used herein, the term "channel" refers generally to an optical path, as known in the art. Within the primary channel A, the first beam of light 212a is directed toward an ICE core 214, which may be substantially similar to the ICE core 100 described above with reference to FIG. 1. The ICE core 214 may be configured to produce modified electromagnetic radiation 216 corresponding to the characteristic or analyte of interest. In particular, the modified electromagnetic radiation 216 may include electromagnetic radiation that has optically interacted with the ICE core 214, whereby an approximation of the regression vector corresponding to the characteristic of interest is obtained.

Within the primary channel A, the modified electromagnetic radiation 216 is subsequently conveyed to a primary detector 218 for quantification. The primary detector 218 may be any device capable of detecting electromagnetic radiation, and may be generally characterized as an optical transducer. For example, the primary detector 218 may be, but is not limited to, a thermal detector such as a thermopile or photoacoustic detector, a semiconductor detector, a piezo-electric detector, a charge coupled device (CCD) detector, a video or array detector, a split detector, a photon detector (such as a photomultiplier tube), photodiodes, combinations thereof, or the like, or other detectors known to those skilled in the art.

The primary detector 218 may then produce an output signal 220 in the form of a voltage (or current) that corresponds to the particular characteristic of the sample substance 202. In at least one embodiment, the output signal 220 produced by the primary detector 218 and the concentration of the characteristic of the sample substance 202 may be directly proportional. In other embodiments, however, the relationship may correspond to a polynomial function, an exponential function, a logarithmic function, and/or a combination thereof.

The second beam of light 212b may be directed within the reference channel B toward a reference detector 222. The reference detector 222 may be similar to the primary detector 218 and capable of detecting electromagnetic radiation. In some embodiments, the reference detector 222 may be used to detect radiating deviations stemming from the electromagnetic radiation source 204 and its optical interaction with the sample substance 202. Radiating deviations can occur in the intensity of the light propagating in the primary channel A due to a wide variety of reasons, such as a film of material build-up on the windows of an interrogation space, which has the effect of reducing the amount of light reaching the reference detector 222.

Another form of radiating deviations encompasses light intensity fluctuations of the electromagnetic radiation 206 as it optically-interacts (e.g., transmission, reflection, etc.) with the sample substance 202. According to the present disclosure, Applicants believe that such light intensity fluctuations may be indicative of the emulsive state of the sample substance 202. As indicated above, the term "emulsive state" refers to the phase or state of a fluid and whether said fluid has formed an emulsion, dispersion, microdispersion, colloid, a stable micelle solution, or any combination thereof.

The reference detector 222 may be configured to generate a reference signal 224 corresponding to the radiating deviations detected in the reference channel B. In some embodiments, the reference signal 224 may be used to normalize the output signal 220. More particularly, the reference signal 224 and the output signal 220 may be transmitted to or otherwise received by a signal processor 226 in communication with each detector 218, 222. The signal processor 226 may be configured to computationally combine the reference signal 224 with the output signal 220 in order to normalize the output signal 220 in view of any radiating deviations detected by the reference detector 222. In some embodiments, computationally combining the output and reference signals 220, 224 may entail computing a ratio of the two signals 220, 224, thereby essentially computing a ratio of the primary and reference channels A and B (e.g., A/B).

The signal processor 226 may also be configured to further process the output and reference signals 220, 224 in order to provide additional characterization information about the sample substance 202 being analyzed, such as the identification and concentration of one or more analytes in the sample substance 202. The concentration of each analyte or the magnitude of each characteristic determined using the optical computing device 200 can be fed into an algorithm run by the signal processor 226. In some embodiments, the algorithm produces an output that is readable by an operator or computer.

In other embodiments, according to the present disclosure, the reference signal 224 may be used to detect and otherwise report the emulsive state of the sample substance 202. More particularly, the reference signal 224 may be conveyed to the signal processor 226 and fed into another algorithm run by the signal processor 226. The algorithm may covert the reference signal 224 into a resulting output signal 228 that may be readable or otherwise interpreted by an operator or a computer. In some embodiments, for instance, the resulting output signal 228 may be displayed on a graphical user interface that may be analyzed by an operator, and the operator may take certain actions based on assessing the graphically-displayed resulting output signal 228. The graphical user interface may be, but is not limited to, a computer monitor, a handheld device screen, and a print out. In other embodiments, the resulting output signal 228 may be processed using a software-based computer program configured to read and interpret the reference signal 224 or the resulting output signal 228 and initiate certain actions based on the interpretation thereof.

It will be appreciated that the reference channel B may be created in a manner that does not detrimentally change the predictive characteristics of ICE core 214 arranged in the primary channel A. Thus, reference channel B may be created by detecting a portion of the electromagnetic radiation 206 (or fluid interacted radiation 208) before striking the ICE core 214. Spectrally neutral elements (e.g., elements whose transmittance, absorbance, and/or reflectance do not vary substantially with wavelength) are generally used to create the reference channel B. At least some spectrally neutral elements that may be used are, but are not limited to, neutral density filters and beam splitters, partially transparent masks, front surface Fresnel reflections, combinations thereof, or similar components.

Figure 3:
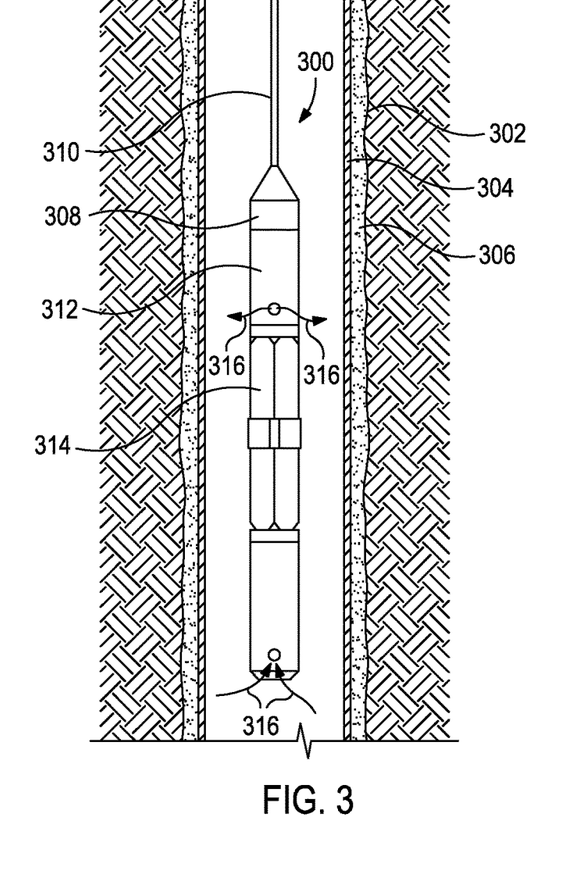
FIG. 3 illustrates an exemplary sampling tool that may be used in accordance with embodiments of the present disclosure.

Referring now to FIG. 3, illustrated is an exemplary sampling tool 300 that may be used in accordance with embodiments of the present disclosure. As illustrated, the sampling tool 300 may be run into a wellbore 302 that is depicted as having a casing string 304 secured therein with cement 306. Although the wellbore 302 is depicted as being cased and cemented, it could alternatively be uncased or open hole, without departing from the scope of the disclosure. Moreover, while not shown, the casing string 304 may be perforated in one or more locations so that fluids from the surrounding subterranean formation can be accessed.

The sampling tool 300 may include a connector 308 that enables the sampling tool 300 to be coupled to or operably associated with a conveyance 310 used to run, retrieve, and position the sampling tool 300 in the wellbore 302. In the illustrated embodiment, the conveyance 310 is depicted as a single strand or multi-strand wireline cable or braided line. In other embodiments, the conveyance 310 may be slickline, electric line, coiled tubing, jointed tubing, wireline, or any combination thereof. Even though the sampling tool 300 is depicted as being connected directly to the connector 308, those skilled in the art will appreciate that the sampling tool 300 could alternatively be coupled within a larger tool string that is being positioned within the wellbore 302 via the conveyance 310, such as a tool string including multiple sampling tools interconnected therein.

The sampling tool 300 may include an actuator module 312 and a sampling module 314. In exemplary operation, the actuator module 312 may be configured to draw in formation fluids 316, pump the formation fluids 316 through the sampling module 314, and subsequently eject the circulated formation fluids 316. The sampling module 314 may be configured to receive and monitor the formation fluids 316 as they are pumped through the sampling tool 300 under predetermined pump conditions or parameters. The sampling module 314 may include various sensors and/or gauges used to monitor and detect various characteristics of the formation fluid 316. For instance, while not shown in FIG. 3, the sampling module 314 may include a densitometer used to monitor the density of the formation fluid 316 and at least one optical computing device used to detect chemical compositions in the formation fluid 316. Valving or other fluid flow control circuitry within the sampling module 314 may be used to enable the formation fluid 316 to be monitored simultaneously or in series by the densitometer and the optical computing device.

In some embodiments, the sampling tool 300 may further include circuitry configured to obtain or otherwise record samples of the formation fluid 316 at predetermined times, intervals, or when directed by an operator or computer system. In at least one embodiment, as discussed in more detail below, the sampling tool 300 may be configured to obtain a sample based on the emulsive state of the formation fluid 316, as detected or reported by the optical computing device. In other embodiments, the sampling tool 300 may be in communication with a surface location and may be configured to send real-time updates of the emulsive state of the formation fluid 316 to the surface for consideration. Such transmission may be effectuated via either wired or wireless communication.

At the surface, the emulsive state of the formation fluid 316 may be analyzed and considered by an operator and the operator may decide to obtain a sample of the formation fluid 316 based on the reported emulsive state. For instance, the operator may decide to obtain a sample when the detected emulsive state indicates that an emulsion or microdispersion of the formation fluid 316 has broken, or when the emulsive state asymptotically stabilizes. In such embodiments, the operator may convey a command signal to the sampling tool 300, and the sampling tool 300 may then proceed to obtain or otherwise record the sample of the formation fluid 316. In other embodiments, a surface computer may be configured to receive and interpret the transmission signals from the sampling tool 300 using software or hardware programming instructions. When the detected emulsive state indicates that an emulsion or microdispersion of the formation fluid 316 has broken, or when the emulsive state asymptotically stabilizes, the computer may be programmed to convey a command signal to the sampling tool 300 to obtain a sample of the formation fluid 316.

Figure 4:
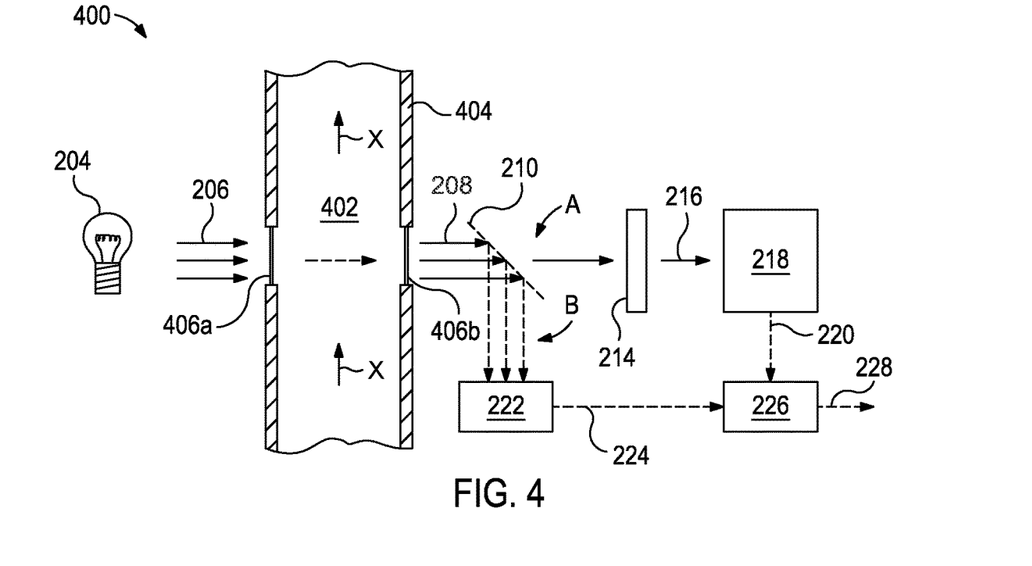
FIG. 4 illustrates an exemplary optical computing device that may implement the principles of the present disclosure and may be used in the sampling tool of FIG. 3.

Referring now to FIG. 4, with continued reference to FIG. 3, illustrated is a schematic diagram of an exemplary optical computing device 400 that may be used in the sampling tool 300 of FIG. 3, according to one or more embodiments. The optical computing device 400 may be similar in some respects to the optical computing device 200 of FIG. 2 and therefore will be best understood with reference thereto, where like numerals represent like elements not described again. As illustrated, the optical computing device 400 may be arranged to monitor a fluid 402, which may be the formation fluid 316 of FIG. 3, and may be contained or otherwise flowing within a flow path 404. In at least one embodiment, the flow path 404 may be a flow line or conduit within the sampling tool 300 of FIG. 3 and leading to the optical computing device 400. The fluid 402 may be flowing within the flow path 404 as indicated by the arrows X.

The optical computing device 400 may include the electromagnetic radiation source 204 configured to emit or otherwise generate electromagnetic radiation 206. The electromagnetic radiation 206 may be directed toward the fluid 402 and, more particularly, through the fluid 402 via a first sampling window 406a and a second sampling window 406b arranged radially opposite the first sampling window 406a on the flow path 404. The first and second sampling windows 406a,b may be arranged adjacent to or otherwise in contact with the fluid 402 for detection purposes. The sampling windows 406a,b may be made from a variety of transparent, rigid or semi-rigid materials that are configured to allow transmission of the electromagnetic radiation 206 therethrough. For example, the sampling windows 406a,b may be made of glasses, plastics, semi-conductors, crystalline materials, polycrystalline materials, hot or cold-pressed powders, combinations thereof, or the like.

As the electromagnetic radiation 206 passes through the fluid 402 via the first and second sampling windows 406a,b, it optically interacts with the fluid 402 and fluid interacted radiation 208 is subsequently generated. Those skilled in the art will readily recognize that alternative variations of the device 400 may allow the fluid interacted radiation 208 to be generated by being reflected from the fluid 402, without departing from the scope of the disclosure.

The fluid interacted radiation 208 generated by the interaction with the fluid 402 may be directed to or otherwise received by the ICE core 214 arranged within the primary channel A of the device 400. In other embodiments, however, more than one ICE core 214 may be employed within the primary channel A. Upon optically interacting with the fluid interacted radiation 208, the ICE core 214 produces the modified electromagnetic radiation 216 that may be detected by the primary detector 218. The primary detector 218 then produces the output signal 220, which is conveyed to the signal processor 226 for quantification, as generally described above.

The device 400 may further include the reference detector 222 arranged in the reference channel B and configured to receive and otherwise detect at least a portion of the fluid interacted radiation 208. The reference detector 222 may generate the reference signal 224 corresponding to radiating deviations detected in the reference channel B. As briefly discussed above, in some embodiments, the reference signal 224 may be used to normalize the output signal 220 by being computationally combined therewith using the signal processor 226. In other embodiments, however, the reference signal 224 may be used to detect and otherwise monitor the emulsive state of the fluid 402.

More particularly, the reference signal 224 may be conveyed to the signal processor 226 and fed into an algorithm run by software instructions executed by the signal processor 226. The algorithm may covert the reference signal 224 into the resulting output signal 228, which may be indicative of the emulsive state of the fluid 402, and may be readable or otherwise interpreted by an operator or a computer unit. Accordingly, in some embodiments, the signal processor 226 may be arranged downhole, such as forming an integral part of the sampling tool 300 (FIG. 3). In other embodiments, however, the signal processor 226 may be arranged at a surface location, and the sampling tool 300 may be configured to convey the reference signal 224 uphole and out of the wellbore 302 (FIG. 3) to the signal processor 226 for processing.

Referring again to FIG. 3, with continued reference to FIG. 4, while circulating the formation fluid 316 through the sampling tool 300, the formation fluid 316 may form an emulsion or microdispersion based on the pump out conditions or operational parameters of the sampling tool 300, the environmental parameters of the wellbore 302, or a combination thereof. In other cases, the environmental parameters of the wellbore 302, such as ambient pressure and temperature, may alone facilitate the formation of an emulsion or microdispersion in the formation fluid 316. In the event an emulsion or microdispersion is formed, the optical computing device 400 may be unable to accurately detect the chemical components of the formation fluid 316.

According to the present disclosure, the reference signal 224 and the resulting output signal 228 of the optical computing device 400 may prove advantageous in providing and reporting the emulsive state of the formation fluid 316, and thereby informing an operator whether an emulsion or microdispersion is present in the formation fluid 316 for sampling purposes. In some embodiments, the signal processor 226 may be configured to display the resulting output signal 228 on a graphical user interface, such as a graphical output or plot that may be analyzed in real-time by an operator. Based on an assessment of the graphically-displayed resulting output signal 228, the operator may decide to undertake various actions. For instance, in some cases, the operator may decide to obtain a sample of the formation fluid 316 upon observing that the emulsive state of the formation fluid 316 has asymptotically stabilized. In other cases, the operator may decide to obtain a sample of the formation fluid 316 upon observing that an emulsion or microdispersion in the formation fluid 316 has broken or otherwise destabilized.

In yet other cases, the operator may decide to alter the pump parameters of the sampling tool 300 based on the reported emulsive state of the formation fluid 316. More particularly, the operator may desire to slow the pump flow rate into the sampling tool 300 in order to minimize the formation of an emulsion or microdispersion. In other embodiments, however, the operator may decide to increase the flow rate of the formation fluid 316 flowing into the sampling tool 300, which may minimize the water content in the incoming formation fluid 316 and thereby destabilize or potentially break an emulsion or microdispersion.

In some embodiments, the reference signal 224 and/or the resulting output signal 228 of the optical computing device 400 may instead be received and interpreted by a downhole or surface computer (not shown) communicably coupled to the sampling tool 300. More particularly, the computer may include software or hardware programming instructions that, when executed by a processor of the computer, may analyze the resulting output signal 228 to determine a real-time emulsive state of the formation fluid 316. When the detected emulsive state indicates that an emulsion of the formation fluid 316 has broken or asymptotically stabilized, the computer may be configured to convey a command signal to an operator or the sampling tool 300 to obtain a sample of the formation fluid 316. In other embodiments, the programming instructions of the computer may alter the pump parameters of the sampling tool 300, such as by increasing or decreasing the flow rate of the formation fluid 316 being drawn into the sampling tool 300. As discussed above, altering the pump parameters may result in the minimization of the emulsion or microdispersion, the minimization of the water content in the incoming formation fluid 316, and/or the destabilization of or potential break in the emulsion or microdispersion.

For the purposes of this disclosure, it will be appreciated that the device 400 may include only the reference channel B and the primary channel A may otherwise be omitted from the device 400. In such embodiments, the device 400 may be utilized for primarily detecting and reporting the emulsive state of the formation fluid 316, while the characteristics of the formation fluid 316 could be determined with another optical computing device or the like. Accordingly, in at least some embodiments, the reference channel B may be characterized and otherwise referred to as an "optical" channel that is defined within the device 400.

Figure 5:
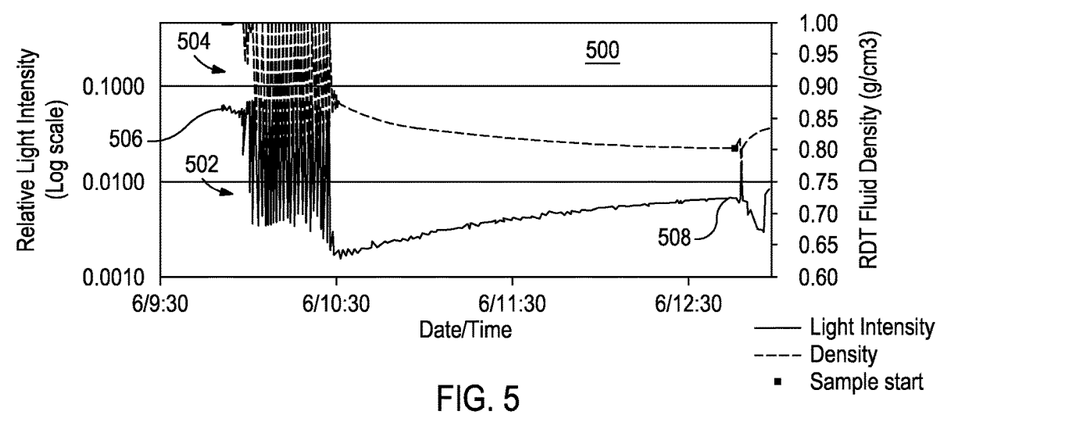
FIG. 5 depicts a plot that demonstrates the principles of the present disclosure.

Referring now to FIG. 5, with continued reference to FIGS. 3 and 4, illustrated is a plot 500 that demonstrates one or more principles of the present disclosure. The plot 500 may be an exemplary graphical output that may be provided to a user or operator to track or otherwise monitor the real-time operation of the sampling tool 300 while circulating formation fluids 316 therethrough. The plot 500 may provide a reference channel curve 502 and a densitometer curve 504 plotted over time. More particularly, the reference channel curve 502 represents the reference signal 224 and/or the resulting output signal 228 of the optical computing device 400 of FIG. 4 and is plotted as relative light intensity in log scale on the left side of the plot 500. The densitometer curve 504 represents a density signal of the formation fluid 316 derived from a densitometer device arranged in the sampling tool 300 of FIG. 3 and is plotted as fluid density (g/cm$^3$) on the right side of the plot 500.

Comparing the reference channel curve 502 and the densitometer curve 504 shows an excellent correlation between the light intensity derived from the reference channel B of the optical computing device 400 and the density values detected by the densitometer. As the formation fluid 316 is drawn into the sampling tool 300, it is initially detected as water, as at 506, and the flow then begins to oscillate between water (high signal) and oil (low signal). Such oscillation of the incoming fluid is indicative of slug flow, which results from pumping the formation fluid 316 into the sampling tool 300. As the slugs flow past the densitometer and the optical computing device 400 (FIG. 4), the densitometer curve 504 provides the real-time fluid density of the formation fluid 316, and the reference channel curve 502 provides the optical density of the formation fluid 316 or, in other words, the intensity of the electromagnetic radiation 206 after having optically interacted with the formation fluid 316.

As illustrated in the plot 500, the oscillation between oil and water changes at about time 10:30. At that point, the reference channel curve 502 reports a decrease in light intensity by a factor of about three. This dramatic decrease in light intensity corresponds to a change in the emulsive state of the formation fluid 316 and may indicate the onset of an emulsion or microdispersion in the formation fluid 316. As indicated above, the onset of the emulsion or microdispersion may be attributed to pump parameters of the sampling tool 300, wellbore environmental parameters (i.e., pressure, temperature), or a combination of both.

Following this change in the emulsive state, the plot 500 shows that the light intensity of the formation fluid 316 gradually begins to increase over time. This slow increase in the light intensity indicates that the emulsion or microdispersion in the formation fluid 316 coursing through the sampling tool 300 is becoming progressively finer. In some cases, as illustrated at 508, the light intensity of the formation fluid may eventually reach a point when it asymptotically stabilizes or substantially stabilizes along an asymptote. When the reference channel curve 502 reaches an asymptote or substantial asymptote, this does not necessarily indicate that the emulsion or microdispersion has broken (e.g., ceased to exist), but may indicate that the formation fluid 316 coursing through the sampling tool 300 consists mostly or primarily of oil. In other cases (not illustrated), the reference channel curve 502 may again report slug flow and begin to oscillate between high and low signals, which may be indicative of the destabilization of or break in the emulsion or microdispersion.

The plot 500 may be provided to an operator in real-time so that sampling decisions of the formation fluid 316 may be based on the emulsive state of the formation fluid 316. For instance, it may be preferable to sample the formation fluid 316 when the reference channel curve 502 is oscillating, which is indicative of the absence of an emulsion or microdispersion. Otherwise, it may be desired to sample the formation fluid 316 when the reference channel curve 502 asymptotically stabilizes, as at 508. Moreover, while monitoring the plot 500, the operator (or a computer program) may also decide to alter the pump parameters of the sampling tool 300 until the reference channel curve 502 asymptotically stabilizes or otherwise commences slug oscillation once again.

It should be noted that the densitometer curve 504 corresponding to the densitometer does not change or indicate any presence of an emulsion or emulsive state, but merely measures the real time density of the fluid. Prior to the present disclosure, densitometer readings constituted one of the best diagnostics for a well operator to determine the state of the fluid. With the improvements of the present disclosure, however, a well operator may be provided with the real time reading of light intensity through the fluid, which may correspond to the emulsive state of the fluid.

Figure 6:
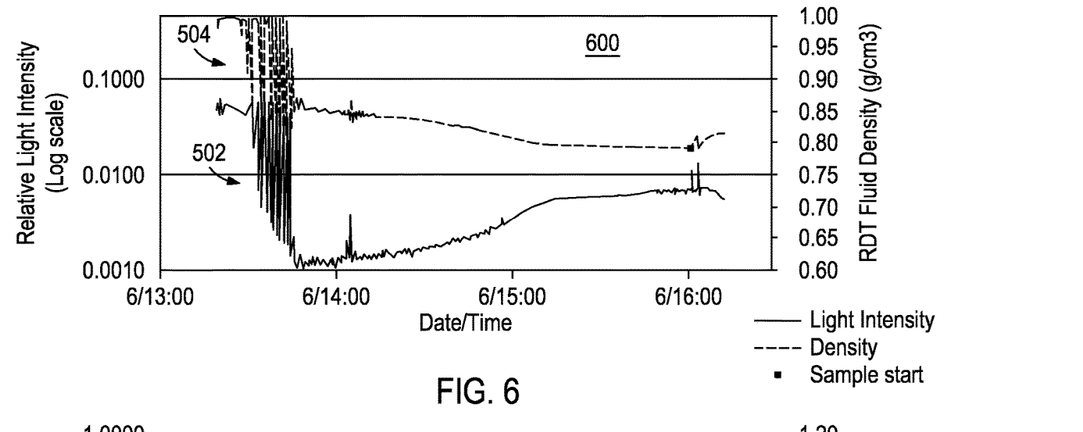
FIG. 6 depicts another plot that demonstrates the principles of the present disclosure.

Referring to FIG. 6, with continued reference to FIGS. 3-5, illustrated is another plot 600 that demonstrates one or more principles of the present disclosure. Similar to the plot 500, the plot 600 may also be a graphical output provided to a user or operator to track or otherwise monitor the real-time operation of the sampling tool 300 while circulating formation fluid 316. More particularly, the plot 600 provides the reference channel curve 502 and the densitometer curve 504 plotted over time during a second pump-out using the sampling tool 300. As illustrated, the reference channel curve 502 and the densitometer curve 504 depict a similar pattern during the second pump-out, where an emulsion or microdispersion is formed at or about time 13:50, and the reference channel curve 502 gradually stabilizes asymptotically.

Figure 7:
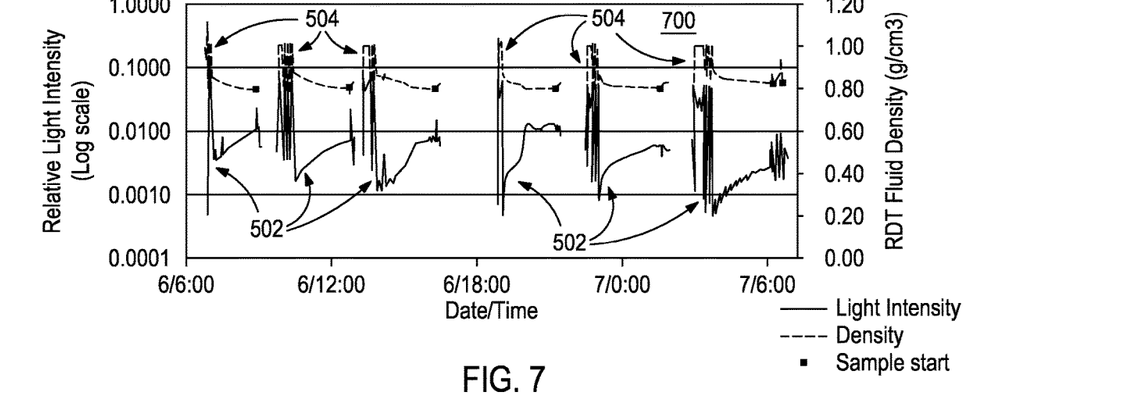
FIG. 7 depicts another plot that demonstrates the principles of the present disclosure.

Referring now to FIG. 7, with continued reference to FIGS. 3-6, illustrated is another plot 700 that demonstrates one or more principles of the present disclosure. Similar to the plots 500 and 600 of FIGS. 5 and 6, respectively, the plot 700 may also be a graphical output provided to a user or operator to track or otherwise monitor the real-time operation of the sampling tool 300 while circulating formation fluid 316. More particularly, the plot 700 provides several reference channel curves 502 and densitometer curves 504 plotted over time during six pump-outs using the sampling tool 300. As illustrated, the reference channel curves 502 and the densitometer curves 504 each depict a generally similar pattern during each of the six pump-outs, where an emulsion or microdispersion is formed at one point, and the reference channel curves 502 gradually stabilize asymptotically.

Computer hardware used to implement the various methods and algorithms described herein can include a processor configured to execute one or more sequences of instructions, programming stances, or code stored on a non-transitory, computer-readable medium. The processor can be, for example, a general purpose microprocessor, a microcontroller, a digital signal processor, an application specific integrated circuit, a field programmable gate array, a programmable logic device, a controller, a state machine, a gated logic, discrete hardware components, an artificial neural network, or any like suitable entity that can perform calculations or other manipulations of data. In some embodiments, computer hardware can further include elements such as, for example, a memory (e.g., random access memory (RAM), flash memory, read only memory (ROM), programmable read only memory (PROM), electrically erasable programmable read only memory (EEPROM)), registers, hard disks, removable disks, CD-ROMS, DVDs, or any other like suitable storage device or medium.

Executable sequences described herein can be implemented with one or more sequences of code contained in a memory. In some embodiments, such code can be read into the memory from another machine-readable medium. Execution of the sequences of instructions contained in the memory can cause a processor to perform the process steps described herein. One or more processors in a multi-processing arrangement can also be employed to execute instruction sequences in the memory. In addition, hard-wired circuitry can be used in place of or in combination with software instructions to implement various embodiments described herein. Thus, the present embodiments are not limited to any specific combination of hardware and/or software.

As used herein, a machine-readable medium will refer to any medium that directly or indirectly provides instructions to a processor for execution. A machine-readable medium can take on many forms including, for example, non-volatile media, volatile media, and transmission media. Non-volatile media can include, for example, optical and magnetic disks. Volatile media can include, for example, dynamic memory. Transmission media can include, for example, coaxial cables, wire, fiber optics, and wires that form a bus. Common forms of machine-readable media can include, for example, floppy disks, flexible disks, hard disks, magnetic tapes, other like magnetic media, CD-ROMs, DVDs, other like optical media, punch cards, paper tapes and like physical media with patterned holes, RAM, ROM, PROM, EPROM and flash EPROM.

The subject matter of the present application may have particular relevant or utility in logging while drilling applications and any wireline applications used to perform wellbore operations.

Embodiments disclosed herein include:

A. A method that includes emitting electromagnetic radiation from an electromagnetic radiation source, optically interacting the electromagnetic radiation with a fluid and thereby generating fluid interacted radiation, detecting a portion of the fluid interacted radiation with a reference detector arranged within an optical channel of an optical computing device, generating a reference signal with the reference detector, and determining an emulsive state of the fluid based on the reference signal.

B. A method that includes pumping a formation fluid from a subterranean formation into a sampling tool, monitoring the formation fluid with at least one optical computing device as it flows through the sampling tool, wherein monitoring the formation fluid includes optically interacting electromagnetic radiation with the formation fluid and thereby generating fluid interacted radiation, detecting a portion of the fluid interacted radiation with a reference detector arranged within an optical channel of the at least one optical computing device, generating a reference signal with the reference detector, and determining an emulsive state of the formation fluid based on the reference signal, and altering one or more pump parameters of the sampling tool based on the emulsive state of the formation fluid.

Each of embodiments A and B may have one or more of the following additional elements in any combination: Element 1: wherein optically interacting the electromagnetic radiation with the fluid comprises at least one of transmitting the electromagnetic radiation through the fluid and reflecting the electromagnetic radiation off the fluid. Element 2: further comprising obtaining a sample of the fluid based on the emulsive state. Element 3: further comprising receiving the reference signal with a signal processor communicably coupled to the reference detector, processing the reference signal with the signal processor to obtain a resulting output signal, and monitoring the resulting output signal to determine the emulsive state of the fluid. Element 4: wherein processing the reference signal with the signal processor further comprises graphically displaying the reference signal on a graphical user interface with the signal processor, and wherein determining the emulsive state of the fluid comprises examining the reference signal on the graphical user interface. Element 5: further comprising obtaining a sample of the fluid when the emulsive state of the fluid asymptotically stabilizes. Element 6: further comprising obtaining a sample of the fluid when the reference signal indicates that an emulsion or microdispersion of the fluid has broken or destabilized. Element 7: wherein the optical computing device includes a beam splitter, and wherein detecting the portion of the fluid interacted radiation with the reference detector comprises receiving the fluid interacted radiation with the beam splitter, splitting the fluid interacted radiation to generate the portion of the fluid interacted radiation, and directing the portion of the fluid interacted radiation toward the reference detector with the beam splitter. Element 8: wherein the optical channel is a reference channel defined within the optical computing device, the method further comprising optically interacting the fluid interacted radiation with an integrated computational element (ICE) arranged within a primary channel of the optical computing device and thereby generating modified electromagnetic radiation, receiving the modified electromagnetic radiation from the ICE with a primary detector, and generating an output signal with the primary detector corresponding to a characteristic of the fluid. Element 9: further comprising obtaining a sample of the formation fluid based on the emulsive state. Element 10: further comprising receiving the reference signal with a signal processor communicably coupled to the reference detector, processing the reference signal with the signal processor to obtain a resulting output signal, and monitoring the resulting output signal to determine the emulsive state of the formation fluid. Element 11: wherein processing the reference signal with the signal processor further comprises graphically displaying the reference signal on a graphical user interface with the signal processor, and wherein determining the emulsive state of the formation fluid comprises examining the reference signal on the graphical user interface. Element 12: further comprising obtaining a sample of the fluid when the emulsive state of the fluid asymptotically stabilizes. Element 13: further comprising obtaining a sample of the fluid when the reference signal indicates that an emulsion of the fluid has broken. Element 14: further comprising monitoring the formation fluid with a densitometer arranged within the sampling tool, generating a densitometer signal with the densitometer, and obtaining a sample of the formation fluid based on the reference and densitometer signals. Element 15: further comprising graphically displaying the reference signal and the densitometer signal on a graphical user interface, and examining the reference and densitometer signals on the graphical user interface to determine when to sample the formation fluid. Element 16: wherein altering the one or more pump parameters of the sampling tool comprises increasing or decreasing a speed of the pump, and obtaining a sample of the formation fluid when the reference signal asymptotically stabilizes or indicates that an emulsion or microdispersion of the formation fluid has broken. Element 17: wherein optically interacting the electromagnetic radiation with the sample comprises emitting electromagnetic radiation from an electromagnetic radiation source, and transmitting the electromagnetic radiation through the sample to generate the fluid interacted radiation. Element 18: wherein the optical channel is a reference channel defined within the optical computing device, and wherein monitoring the formation fluid further comprises optically interacting a second portion of the fluid interacted radiation with an integrated computational element (ICE) arranged within a primary channel of the optical computing device and thereby generating modified electromagnetic radiation, receiving the modified electromagnetic radiation from the ICE with a primary detector, and generating an output signal with the primary detector corresponding to a characteristic of the formation fluid.

Therefore, the disclosed systems and methods are well adapted to attain the ends and advantages mentioned as well as those that are inherent therein. The particular embodiments disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope of the present disclosure. The systems and methods illustratively disclosed herein may suitably be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

As used herein, the phrase "at least one of" preceding a series of items, with the terms "and" or "or" to separate any of the items, modifies the list as a whole, rather than each member of the list (i.e., each item). The phrase "at least one of" allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

What is claimed is:

1. A method, comprising:
   emitting electromagnetic radiation from an electromagnetic radiation source;
   optically interacting the electromagnetic radiation with a fluid and thereby generating fluid interacted radiation;
   detecting a portion of the fluid interacted radiation with a reference detector arranged within an optical channel on an optical computing device, wherein the optical channel is a reference channel defined within the optical computing device;
   optically interacting the fluid interacted radiation with an integrated computational element (ICE) arranged within a primary channel of the optical computing device and thereby generating modified electromagnetic radiation;
   receiving the modified electromagnetic radiation from the ICE with a primary detector;
   generating an output signal with the primary detector;
   generating a reference signal with the reference detector;
   normalizing the output signal of the primary detector based on the reference signal to generate a resulting output signal;
   monitoring the reference signal over time;
   detecting a change in the monitored reference signal comprising detecting a change in oscillations of the monitored reference signal corresponding to a decrease in an intensity of the detected portion of the fluid interacted radiation by a factor of about three; and
   determining an emulsive state of the fluid based on the detected change in the oscillations of the monitored reference signal.

2. The method of claim 1, wherein optically interacting the electromagnetic radiation with the fluid comprises at least one of transmitting the electromagnetic radiation through the fluid and reflecting the electromagnetic radiation off the fluid.

3. The method of claim 1, further comprising obtaining a sample of the fluid at a time determined based on the reference signal.

4. The method of claim 1, further comprising: detecting an increase in the intensity of the monitored reference signal after detecting the change in the monitored reference signal comprising detecting the change in oscillations of the monitored reference signal corresponding to the decrease in the intensity of the detected portion of the fluid interacted radiation by the factor of about three.

5. The method of claim 4, further comprising: after detecting the increase in the intensity of the monitored reference signal, obtaining a sample of the fluid when the increase in the monitored reference signal asymptotically stabilizes.

6. The method of claim 5, wherein the asymptotic stabilization indicates that an emulsion or microdispersion of the fluid has broken or destabilized.

7. The method of claim 1, wherein the optical computing device includes a beam splitter, and wherein detecting the portion of the fluid interacted radiation with the reference detector comprises:
   receiving the fluid interacted radiation with the beam splitter;
   splitting the fluid interacted radiation to generate the portion of the fluid interacted radiation; and
   directing the portion of the fluid interacted radiation toward the reference detector with the beam splitter.

8. The method of claim 1, further comprising:
   generating the output signal with the primary detector corresponding to a characteristic of the fluid.

9. A method, comprising:
pumping a formation fluid from a subterranean formation into a sampling tool;
monitoring the formation fluid with at least one optical computing device as it flows through the sampling tool, wherein monitoring the formation fluid includes:
optically interacting electromagnetic radiation with the formation fluid and thereby generating fluid interacted radiation;
detecting a portion of the fluid interacted radiation with a reference detector arranged within an optical channel of the at least one optical computing device, wherein the optical channel is a reference channel defined within the optical computing device;
optically interacting the fluid interacted radiation with an integrated computational element (ICE) arranged within a primary channel of the optical computing device and thereby generating a modified electromagnetic radiation;
receiving the modified electromagnetic radiation from the ICE with a primary detector;
generating an output signal with the primary detector;
generating a reference signal with the reference detector;
normalizing the output signal of the primary detector based on the reference signal to generate a resulting output;
monitoring the reference signal over time;
detecting a change in the monitored reference signal comprising detecting a change in oscillations of the monitored reference signal corresponding to a decrease in an intensity of the detected portion of the fluid interacted radiation by a factor of about three; and
determining an emulsive state of the fluid based on the detected change in the oscillations of the monitored reference signal; and
altering one or more pump parameters of the sampling tool based on the emulsive state of the formation fluid.

10. The method of claim 9, further comprising obtaining a sample of the formation fluid at a time determined based on the reference signal.

11. The method of claim 9, further comprising: detecting an increase in the intensity of the monitored reference signal after detecting the change in the monitored reference signal comprising detecting the change in oscillations of the monitored reference signal corresponding to the decrease in the intensity of the detected portion of the fluid interacted radiation by the factor of about three.

12. The method of claim 11, further comprising: after detecting the increase in the intensity of the monitored reference signal, obtaining a sample of the formation fluid when the increase in the monitored reference signal asymptotically stabilizes.

13. The method of claim 12, wherein the asymptotic stabilization indicates that an emulsion or microdispersion of the formation fluid has broken or destabilized.

14. The method of claim 9, further comprising:
monitoring the formation fluid with a densitometer arranged within the sampling tool;
generating a densitometer signal with the densitometer; and
obtaining a sample of the formation fluid based on the reference signal and the densitometer signal.

15. The method of claim 14, further comprising:
graphically displaying the reference signal and the densitometer signal on a graphical user interface.

16. The method of claim 9, wherein altering the one or more pump parameters of the sampling tool comprises:
increasing or decreasing a speed of the pump; and
obtaining a sample of the formation fluid when the reference signal asymptotically stabilizes or indicates that an emulsion or microdispersion of the formation fluid has broken.

17. The method of claim 9, wherein optically interacting the electromagnetic radiation with the formation fluid comprises:
emitting electromagnetic radiation from an electromagnetic radiation source; and
transmitting the electromagnetic radiation through the formation fluid to generate the fluid interacted radiation.

18. The method of claim 17, further comprising generating the output signal with the primary detector corresponding to a characteristic of the formation fluid.

* * * * *